United States Patent
Spratte et al.

(10) Patent No.: US 10,436,321 B2
(45) Date of Patent: Oct. 8, 2019

(54) PARKING LOCK GEAR MECHANISM, AND METHOD FOR OPERATING A PARKING LOCK GEAR MECHANISM OF A VEHICLE

(71) Applicant: ZF Friedrichshafen AG, Friedrichshafen (DE)

(72) Inventors: Joachim Spratte, Osnabrueck (DE); Angela Squeri, Oberteuringen (DE); Ulrich Mair, Friedrichshafen (DE); Michael Linder, Kressbronn am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 92 days.

(21) Appl. No.: 15/741,053

(22) PCT Filed: May 30, 2016

(86) PCT No.: PCT/EP2016/062186
§ 371 (c)(1),
(2) Date: Dec. 29, 2017

(87) PCT Pub. No.: WO2017/005407
PCT Pub. Date: Jan. 12, 2017

(65) Prior Publication Data
US 2018/0172155 A1      Jun. 21, 2018

(30) Foreign Application Priority Data

Jul. 3, 2015 (DE) .......... 10 2015 008 499
Dec. 22, 2015 (DE) .......... 10 2015 226 594

(51) Int. Cl.
*F16H 63/34* (2006.01)
*B60T 1/00* (2006.01)
*B60T 1/06* (2006.01)
(Continued)

(52) U.S. Cl.
CPC .......... *F16H 63/3466* (2013.01); *B60T 1/005* (2013.01); *B60T 1/062* (2013.01);
(Continued)

(58) Field of Classification Search
None
See application file for complete search history.

(56) References Cited

U.S. PATENT DOCUMENTS 3,905,252 A * 9/1975 Zaiser .................. F16H 3/66
                                                        475/269
4,223,570 A * 9/1980 Yamamori ........... F16C 19/548
                                                        475/71
(Continued)

FOREIGN PATENT DOCUMENTS

DE        100 46 589 A1    4/2002
DE   10 2013 213 707 A1    1/2015
JP          2003-185018 A  7/2003

OTHER PUBLICATIONS

International Search Report and Written Opinion of the International Search Authority dated Jul. 29, 2016 in International Application No. PCT/EP2016/062186 (English and German languages) (12 pp.).
Search Report dated Sep. 26, 2016 for German Patent Application No. 10 2015 226 594.3, (11 pp.), note: pp. 1 and 2 are English language Explanations to Section C. Result of Determination Document.

*Primary Examiner* — Colby M Hansen
(74) *Attorney, Agent, or Firm* — Brinks Gilson & Lione

(57) ABSTRACT

The present disclosure describes a parking lock gear mechanism including a planetary gear train with a sun gear, a ring gear, and at least one planet gear that meshes with the sun gear and the ring gear. The at least one planet gear may be attached to a rotating planet carrier. The parking lock gear mechanism may also have a spring unit coupled to the ring gear, where the spring unit is configured such that it is tensioned by a rotation of the ring gear, and exerts a torque and/or force on the ring gear when it is tensioned. A ring gear
(Continued)

securing unit may be configured to secure the ring gear against rotation in a first operating state, and to release the ring gear such that it can rotate in a second operating state.

20 Claims, 4 Drawing Sheets

(51) Int. Cl.
  *F16D 63/00* (2006.01)
(52) U.S. Cl.
  CPC ....... *F16D 63/006* (2013.01); *F16H 63/3475* (2013.01); *F16H 63/3491* (2013.01)

(56) References Cited

U.S. PATENT DOCUMENTS

| | | | | |
|---|---|---|---|---|
| 4,537,092 | A | * | 8/1985 | Morisawa ................ F16H 3/66 475/285 |
| 4,817,463 | A | | 4/1989 | Cameron |
| 5,389,047 | A | * | 2/1995 | Akiyama ................ F16H 3/62 192/218 |
| 5,469,457 | A | * | 11/1995 | Nagai .................... B82Y 20/00 372/44.01 |

\* cited by examiner

PARKING LOCK GEAR MECHANISM, AND METHOD FOR OPERATING A PARKING LOCK GEAR MECHANISM OF A VEHICLE

CROSS REFERENCE TO RELATED APPLICATIONS

This application is a filing under 35 U.S.C. § 371 of International Patent Application PCT/EP2016/062186, filed May 30, 2016, and claims the priority of German Patent Application 10 2015 008 499.2, filed Jul. 3, 2015, and German Patent Application No. 10 2015 226 594.3, filed Dec. 22, 2015. All applications listed in this paragraph are herein incorporated by reference in their entireties.

TECHNICAL FIELD

The present invention relates to a parking lock gear mechanism and a method for operating a parking lock gear mechanism of a vehicle in accordance with the main claims.

BACKGROUND

If the shift lever in the automatic transmission is at "P," the parking lock is engaged, and prevents the vehicle from rolling away. The parking lock can be activated via a cable pull from the shift lever. With some automatic transmissions, the engagement and release takes place via an internal hydraulic control device. With some gear mechanisms in a parking lock unit, the actuation also takes place via electric motors. With these, an electric motor actuates the parking lock via a gear mechanism, and thus secures the vehicle so that it cannot roll, or releases it. Electrically actuated parking locks are used with an increasing number of autonomous driving functions, and electric vehicles. The function, "parking lock," is a safety function and should continue to function when there is a full malfunction of all of the electric functions. Some technological solutions implement fallback mechanisms, which engage the parking lock via a spring, for example. However, this spring is tensioned when the parking lock is released. The tensioning of the spring significantly increases the performance demands on the actuator. This results in increased costs and larger space requirements.

On the basis of this background, the present invention provides an improved parking lock gear mechanism and an improved method for operating a parking lock gear mechanism. Advantageous designs can be derived from the following description.

BRIEF SUMMARY

A parking lock gear mechanism for operating a parking lock unit of a vehicle is disclosed herein, wherein the parking lock gear mechanism comprises the following features: a planetary gear train with a sun gear, a ring gear, and at least one planet gear that meshes with the sun gear and the ring gear, wherein the at least one planet gear is attached to a rotating planet carrier; a spring unit, which is coupled to the ring gear, wherein the spring unit is designed such that it is tensioned when the ring gear rotates and exerts a torque and/or force on the ring gear when it is tensioned; a ring gear securing unit, which is designed to secure the ring gear against rotation in a first operating state, and to release the ring gear in a second operating state; and a locking unit coupled to the planet carrier, which is designed to switch the parking lock of the vehicle between a locked state and a released state when the planet carrier rotates, in particular wherein the locked state corresponds to an engaged vehicle parking lock, and the released state corresponds to a disengaged vehicle parking lock.

A parking lock gear mechanism can be understood to be a mechanical gear system, for example, which is designed to drive a unit in a vehicle that implements the parking lock function. A spring unit can be understood to mean a unit that comprises an element that can be at least partially deformed in a reversible manner, such as a spring. A ring gear securing unit can be understood to mean a unit that can fix or set the ring gear in place in a controlled manner. A locking unit can be understood to mean a unit that mechanically guides a switch element for the parking lock unit or the parking lock unit itself.

The approach presented herein is based on the recognition that a parking lock unit can be created or produced such that it is very small and efficient when a parking lock gear mechanism is used that has a special design for actuating this particular parking lock unit. In particular, the ring gear can be pretensioned with the spring unit when the parking lock gear mechanism is actuated, and this pre-tensioning can be maintained by the ring gear securing unit in a first operating state. Moreover, the ring gear can be released such that it rotates in a second operating state, and the spring unit returns it to its original starting position. In this manner, by securing the ring gear or releasing it such that it can rotate, a degree of flexibility is obtained to implement a safety function when the electrical system malfunctions, in particular in modern vehicles that make use of electric or electronic components. The actuation of the parking lock unit can take place directly through a rotation of the planet carrier and a transfer of this rotation by the planet carrier to another component, e.g. the aforementioned switch element of/for the parking lock unit.

The approach presented herein offers the advantage of ensuring a significantly improved functionality through a small-size modification in the parking lock gear mechanism, in particular with regard to the implementation of a safety function in critical situations when operating the vehicle. This modification, in the form of the spring unit and the ring gear securing unit, can be implemented inexpensively through the use of standardized and small components, and moreover, a parking lock gear mechanism modified in this manner only requires a little extra installation space, and therefore such a parking lock gear mechanism can also be accommodated in practically all of the necessary positions in the vehicle.

It is particularly advantageous when the ring gear securing unit in an embodiment of the approach presented herein has an electric actuator, which is configured to bring the ring gear securing unit into the second operating state when it is not supplied with current and/or voltage. Such an embodiment of the approach proposed herein offers the advantage that when the electrical system malfunctions in the vehicle, the ring gear is released such that it can rotate and is then returned to an original position by the spring unit. Safety functions can be implemented in this manner, which enables or facilitates the automatic bringing of the parking lock unit into the "parking lock" operating state when a vehicle electrical system malfunctions.

An embodiment of the approach presented herein in which the electric actuator is an electromagnet, and/or has a projection that engages in the toothed section of the ring gear, can be easily obtained technologically and inexpensively implemented.

According to another embodiment of the approach presented herein, the locking unit can be configured to convert a rotation of the planet carrier into a linear movement of a tappet. Such an embodiment of the approach presented herein offers the advantage that such a movement transformation allows the tappet to move in a manner that ensures a very safe and technologically simple switching between the operating modes of the parking lock unit.

An embodiment of the approach proposed herein in which the locking unit has a stop element configured to limit a movement path of the tappet is particularly advantageous, wherein the locking element is furthermore configured to secure the planet carrier against rotation when the tappet bears on the stop element. Such a stop element can be a section of a housing wall of the parking lock gear mechanism, for example. This type of embodiment of the approach proposed herein offers the advantage that the planet carrier can be very easily secured against rotation, in that the sun gear is driven or rotated further when the tappet bears on the stop element, for example. In this case, movement of the planet carrier is prevented such that the sun gear can move when the at least one planet gear is placed on the ring gear, which can then in turn tension the spring unit, or a spring in the spring unit. In this manner, a very small parking lock gear mechanism can be created with technologically-simple means, which exhibits a great deal of flexibility with respect to the functions that are to be implemented by this gear mechanism.

Alternatively, or additionally, the tappet can be configured in an embodiment of the approach proposed herein, to push a parking lock switch into a securing position on at least one retaining lug when the parking lock unit is moved into the locked state, and to release a movement the parking lock switch from the securing position when the parking lock unit is moved into the released state. Such an embodiment offers the advantage that the parking lock switch can reliably be brought into the locked state of the parking lock unit, and can also be securely retained there.

Furthermore, an embodiment of the approach proposed herein in which the tappet has a cone or cone element, configured or disposed such that it bears against a retention wall in order to push the parking lock switch into the securing position, is advantageous. Such an embodiment offers the advantage that, through the use of a retention wall in conjunction with the cone, a parking lock gear mechanism can be implemented that is easily actuated without a great deal of force. At the same time, it can be ensured that the parking lock switch can be reliably and securely brought into the securing position and retained there.

The transfer of a rotational movement to the parking lock switch of the parking lock unit can then easily take place when the locking unit has a rod gear and/or a worm gear, in accordance with an embodiment of the approach proposed herein.

An embodiment of the approach proposed herein in which a drive unit is coupled to the sun gear, in particular wherein the drive unit comprises an electric motor and/or is connected to the sun gear (e.g. such that they cannot rotate in relation to one another), and/or wherein the drive unit blocks a rotation of the sun gear when no current or voltage is supplied, is particularly advantageous. This makes it possible to use the sun gear as the permanent drive element, and the planet carrier as the output drive element, in particular in relevant critical situations, e.g. when the electrical system malfunctions in the vehicle. A spatially-small and nevertheless reliably-functioning parking lock gear mechanism can be created with structurally simply means in this manner.

Fundamentally, there are two possibilities for bridging the path between the parking lock gear mechanism and the parking lock mechanism in the transmission. Specifically, these comprise a rotational movement and a translational movement. The rotational output can be implemented via an additional spur gear stage, for example. The translational output can be implemented via an eccentric tappet, which then transfers the movement to the transmission via a cable pull.

In particular, an embodiment in which the drive unit comprises a worm gear for transferring a rotational movement to the sun gear is technologically advantageous. Such an embodiment of the approach presented herein offers the advantage that, because the worm gear is self-locking when the sun gear drive malfunctions, the sun gear can be basically fixed in place without requiring an additional securing unit. In this manner, the mechanical conditions prescribed by selected components can be used advantageously for constructing and operating a small planetary gear.

An embodiment of the approach proposed herein in which the spring unit contains a helical spring or a metallic spring is likewise technologically very simple and inexpensive. Such a helical spring or metallic spring exhibits a high return force, has a sufficient service life with respect to the lifetime of a vehicle, and can be securely and reliably coupled to the ring gear.

The advantages and implementations specified above can also be used in another embodiment of the approach proposed herein as a method for operating a variation of a parking lock gear mechanism presented herein. The method has the following steps: blocking a rotation of the planet carrier; tensioning a spring unit; and switching the ring gear securing unit into the first operating state.

Likewise, an embodiment of the approach presented herein as a parking lock gear mechanism control unit, which is designed to carry out the steps of the method in corresponding units in accordance with any of the preceding claims, is also advantageous.

Such a control device or such a control unit can be an electric device, which processes electric signals, e.g. sensor signals, and issues control signals in response thereto. The control device can have one or more suitable interfaces, which can be configured in terms of hardware and/or software. With a hardware design, the interfaces can be part of an integrated circuit, for example, in which functions of the device are implemented. The interfaces can also be unique, integrated circuits, or be composed, at least in-part, of discrete components. With a software design, the interfaces can be software modules, e.g. provided with other software modules on a microcontroller.

A computer program product containing program code, which can be stored on a machine-readable medium, such as a semiconductor memory, a hard disk, or an optical memory, and is used for executing the method according to any of the embodiments described above when the program is executed on a computer or a device, is also advantageous.

BRIEF DESCRIPTION OF THE DRAWINGS

The approach presented herein shall be explained below in greater detail on the basis of the attached figures. Therein.

DETAILED DESCRIPTION

In the following description of advantageous exemplary embodiments of the present invention, the same or similar reference symbols are used for the elements shown in the different figures functioning in a similar manner, wherein the descriptions of these elements shall not be repeated.

Figure 1:
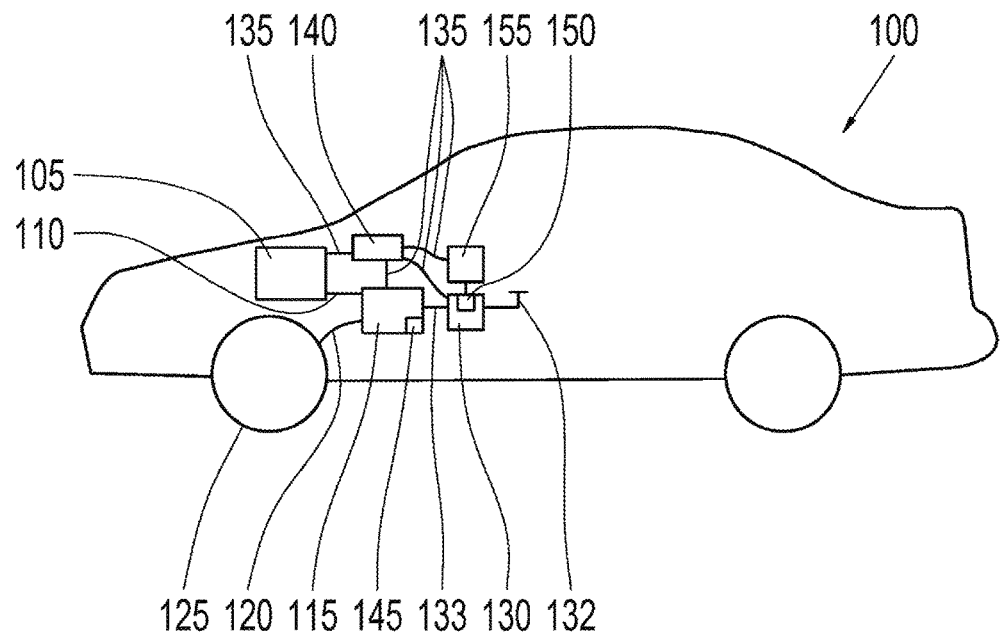
FIG. 1 shows a schematic illustration of a vehicle that has a parking lock gear mechanism and a parking lock gear mechanism control device in accordance with exemplary embodiments of the present invention.

FIG. 1 shows a schematic illustration of a vehicle 100. The vehicle 100 is powered by a drive motor 105, which introduces force or a torque into a transmission 115 via drive train 110, for example, wherein the transmission 115 drives the wheels 125 of a vehicle 100 via a shaft 120, in order to propel the vehicle. In conventional vehicles 100, the drive motor 105 is usually an internal combustion engine, wherein the transmission 115 is either a manual transmission or an automatic transmission. If the transmission 115 is an automatic transmission, there is usually a control unit 130, where an occupant of the vehicle (not shown in FIG. 1) can set the operating mode of the transmission 115 with a shift lever 132, e.g. to a parking mode (referred to as parking lock), reverse, or a forward drive mode. The operating mode that has been set can then be sent via a mechanical and/or electrical control train 133 to the transmission 115, which is then operated in accordance with the operating mode that has been set.

In order to implement functions of the drive motor 105, the transmission 115, and/or the control unit 130, electronic elements are often used, e.g. electromagnets, switches, or electric motors, where they are operated by electrical power drawn from an electrical system 135 of the vehicle 100. The electrical system 135 is supplied with electricity from an energy store 140, wherein this energy store 140 can be a battery or a rechargeable battery.

If the electrical system 135 or the energy store 140 becomes defective, the voltage in the electrical system 135 may fail in the worst case, such that electronic elements supplied with electricity by the electrical system 135 no longer function. In order for the vehicle 100 to nevertheless operate in a safe state, in particular when the vehicle 100 is parked, and to ensure that it will not roll away, it should also be possible to engage the parking lock as a safety function, thus activating a parking lock unit 145 serving as part of the transmission 115, even when the electrical system 135 malfunctions and is unable to supply electricity. The implementation of such an activation of the parking lock unit 145 as a safety function is of particular relevance when the vehicle 100 is an electric vehicle, in which the drive energy for the drive motor 105 is also provided by the energy store 140. In such an electric vehicle, a defect in the electrical system 135 or energy store 140 would otherwise result in it no longer being possible to maintain the vehicle 100 in a safe, resting operating state when stationary.

In order to ensure that the parking lock unit 145 is activated, even when there is a drop in the supply voltage in the electrical system 135, a parking lock gear mechanism 150 can be provided as part of the control unit 130 in accordance with an exemplary embodiment of the approach proposed herein, such that even with a drop in the supply voltage in the electrical system 135, it is possible to reliably and safely engage the parking lock function, i.e. activate the parking lock unit 145 (which can also be referred to as the locked state). The detailed construction of the parking lock gear mechanism 150 shall be explained in greater detail in the following description. In order to be able to make use of the full functionality of the parking lock gear mechanism 150, the parking lock gear mechanism 150 is activated by a parking lock gear mechanism control unit 155 when the electrical system 135 is supplied with voltage, so that the safety functions of the parking lock gear mechanism 150 are primed and initiated for engaging the parking lock, or activating the parking lock unit 145. The function of the parking lock gear mechanism control unit 155 shall be explained in greater detail in the following description.

Figure 2:
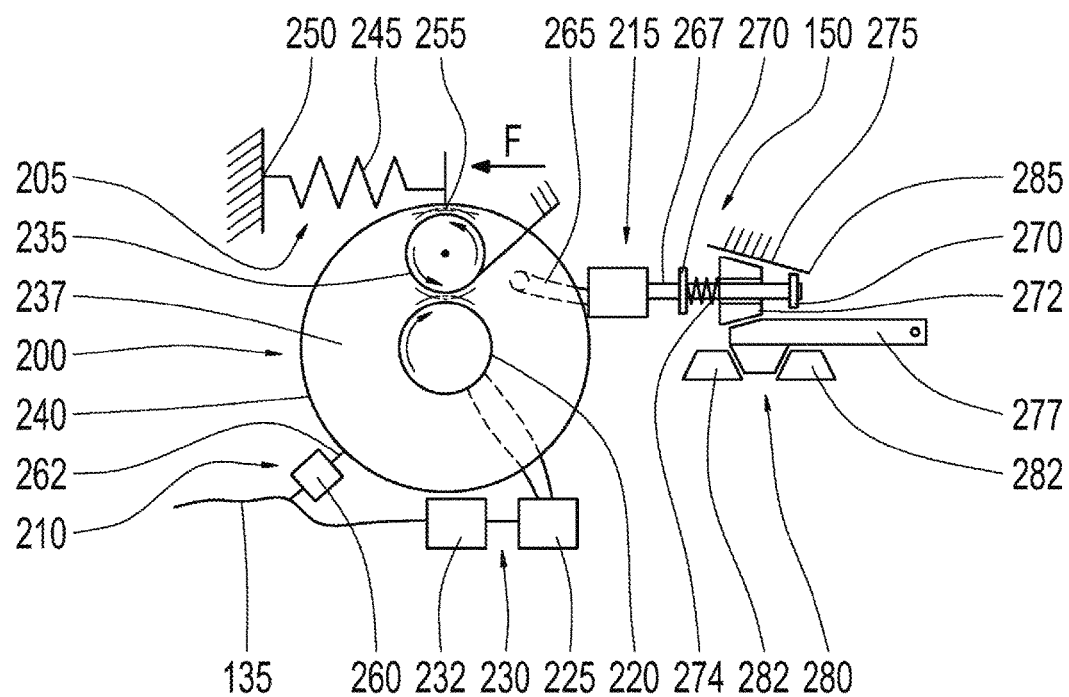
FIG. 2 shows a schematic illustration of a parking lock gear mechanism in accordance with an exemplary embodiment of the approach presented herein.

FIG. 2 shows a schematic illustration of a parking lock gear mechanism 150 in accordance with an exemplary embodiment of the approach presented herein. The parking lock gear mechanism 150 comprises a planetary gear train 200, a spring unit 205, a ring gear securing unit 210, and a locking unit 215.

The planetary gear train 200 has a central, driven sun gear 220, which can be driven, for example, by a worm gear 225 of a drive unit 230 powered by an electrical system 135, for example, in particular by an electric motor 232. Furthermore, the planetary gear train 200 comprises at least one planet gear 235, schematically depicted in FIG. 2, which meshes in the manner of a gearwheel with the sun gear 220, which is designed as a gearwheel, and with the ring gear 240 encompassing the planet gear 235 and the sun gear 220, which is likewise designed as a gearwheel, but with teeth pointing inward. The planet gear 235 is disposed thereby on a rotating planet carrier 237, which is designed as a disk, for example, that has corresponding projections or pins for receiving planet gears 235. It is also conceivable for numerous planet gears, analogous to the planet gear 235, to be connected to the planet carrier.

The spring unit 205 has a spring 245, e.g. a helical spring or some other metallic spring, which is secured at one end to a fixed point 255, e.g. a housing wall of the parking lock gear mechanism 150, and at the other end to an anchor point 255 on the ring gear 250. When the ring gear 250 rotates, the spring 254 of the spring unit 205 is extended or compressed, and therefore tensioned.

The ring gear securing unit 210 has an electromagnet 260 supplied by the electrical system 135, which is configured to extend a pin 262, such that the pin 262 engages with a projection or tooth of the ring gear 240, thus securing the ring gear 240 against rotation. If the power supply to the electromagnet 260 is shut off, which can occur, e.g., through a corresponding switching command or when the supply voltage for the electrical system 135 malfunctions, the pin 262 (which can be referred to as a projection) is retracted, e.g. through spring force, such that the ring gear 240 can again rotate.

Furthermore, the parking lock gear mechanism 150 comprises the locking unit 215 coupled to the planet carrier 237. The locking unit 215 comprises a rod gear 265 that has an eccentric connection to the planet carrier 237, by way of example, or a worm gear (not shown in FIG. 2), which is coupled to a tappet 267, such that the locking unit 215 is configured to transform a rotation of the planet carrier 237 into a linear movement of the tappet 267. Furthermore, a cone element 272 is attached between the tappet 267 and a stop element 270, and the cone element 272 is supported by a spring 274 such that it can move. If the cone element 272 is moved toward the right in FIG. 2, it can slide along a retention wall 275, formed by a housing wall of the parking lock gear mechanism 150, for example, thus pushing it to a side of a parking lock switch 277 lying opposite the retention wall 275, which is part of the control unit 130 that controls the engagement of the parking lock, i.e. the activation of the parking lock unit 145, into a securing position 280 between two retaining lugs 282. If the tappet 267 is moved toward the left in FIG. 2, it carries the cone element 272 therewith, thus releasing the parking lock switch 277, such that it is moved from the securing position 280 by a spring (not shown in FIG. 2), thus disengaging the parking lock, or deactivating the parking lock unit 145 (which can also be referred to as the released state). Alternatively or additionally, a stop element 285 can also be provided, which delimits a linear movement of the tappet 267 opposite the planetary gear train 200. This stop element 285 can likewise by formed by a housing wall of the parking lock gear mechanism 150, and/or it can be formed as an integral part of the retention wall 275.

The functioning of the parking lock gear mechanism 150 illustrated in FIG. 2 shall be explained in greater detail below.

If the drive unit 230 of the parking lock gear mechanism 150 is activated, e.g. by a control signal from the parking lock gear mechanism control unit 155 illustrated in FIG. 1, an electric motor 232 of the drive unit 230 receives electricity from the electrical system 135, and rotates the sun gear 220 in the clockwise direction via the worm gear 225, as is indicated in FIG. 2 by the arrow in the sun gear 220. As a result, the planet gear 235 meshing with the sun gear 220 is rotated in the direction indicated by the arrow in FIG. 2, and this rotational movement is applied to the ring gear 240. After the ring gear 240 is coupled to the fixed point 255 via the spring unit 205, the movement of the ring gear 240 is checked by the spring unit 205, such that a torque is exerted on the planet carrier 237 by the movement of the planet gear 235, which is transformed by the locking unit 215 into a linear movement of the tappet 267 toward the right. When the tappet 267 strikes the stop element 285, further movement toward the right by the tappet 276 is prevented, such that the planet carrier 237 can no longer rotate. When the sun gear 220 is rotated further in the direction of rotation shown in FIG. 2, the ring gear 240 is rotated by the planet gear 235 in a counterclockwise direction, while the planet carrier 237 remains fixed in place, counter to the force exerted by the spring unit 205 on the ring gear 240, such that the spring unit 205 exerts a spring force F, indicated in FIG. 2 counter to the arrow, which tensions the spring unit 205 through a rotation of the ring gear 240. When the spring unit 205 is tensioned, a corresponding control signal from the parking lock gear mechanism control unit 155 from FIG. 1 is likewise transmitted to the ring gear securing unit 210 in order to bring it into the first operating state. In this first operating state, the corresponding electromagnet 260 is activated, for example, and the pin 262 is extended, in order to secure the ring gear 240 in its current position, and thus keep the spring unit 205 tensioned.

As can be seen from the illustration in FIG. 2, the ring gear securing unit 210 of the parking lock switch 277 is in the securing position 280 in this first operating state, such that the parking lock is engaged, i.e. the parking lock unit 145 is activated. If the drive unit 230 is reversed, e.g. by a further control signal from the parking lock gear mechanism control unit 155 shown in FIG. 1, such that the sun gear 220 rotates in the counterclockwise direction, the planet carrier 237 can rotate in a counterclockwise direction as a result of securing the ring gear 240 in place.

Figure 3:
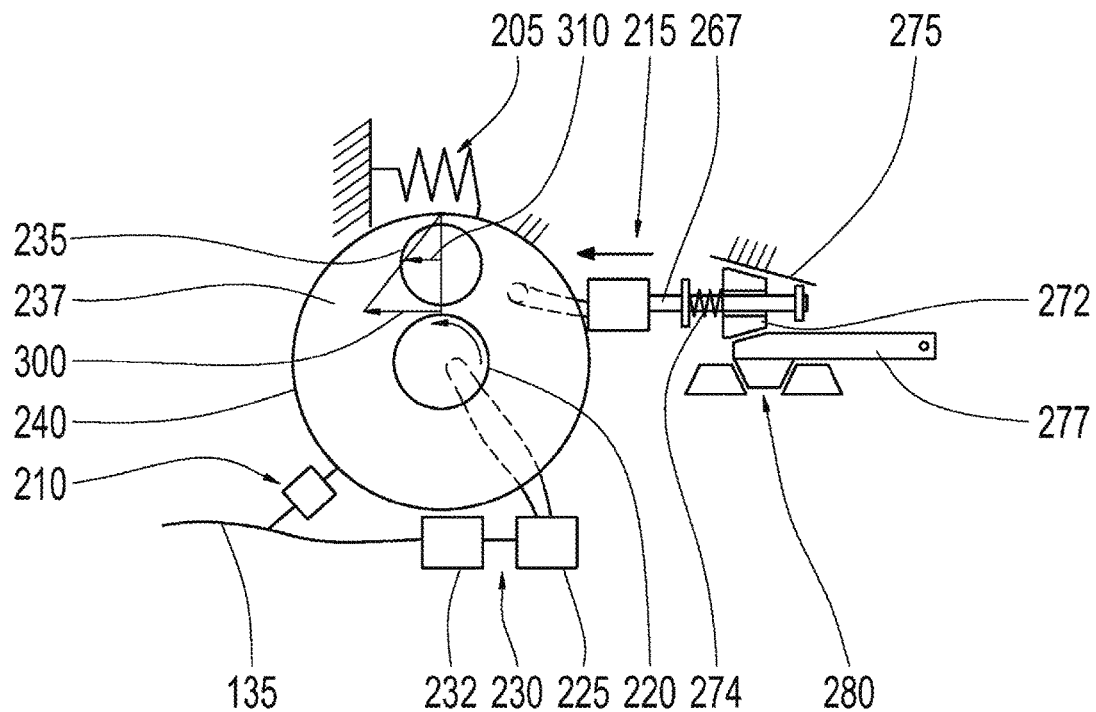
FIG. 3 shows a schematic illustration of the parking lock gear mechanism according to an exemplary embodiment of the approach presented herein, in a first operating state of the ring gear securing unit.

FIG. 3 shows a schematic illustration of the parking lock gear mechanism 150 in accordance with an exemplary embodiment of the approach presented herein, when the ring gear securing unit 210 is in the first operating state. Some of the components shown in FIG. 2 are no longer explicitly illustrated or indicated in FIG. 3 for purposes of clarity, although they are nevertheless still present in the actual parking lock gear mechanism 150. If the sun gear 220 is thus rotated in the counterclockwise direction, as described in the preceding paragraph, e.g. with the speed 300, indicated in FIG. 3 by a corresponding arrow on the circumference of the sun gear 220, the planet carrier is moved in the counterclockwise direction with a speed 310 by the planet gear 235 when the ring gear 240 is fixed in place, as is indicated in the speed diagram in the region of the planet gear 235 in FIG. 3. As a result, the tappet 267 of the locking unit 215 is pulled toward the left, releasing the parking lock switch 277, thus disengaging the parking lock, or deactivating the parking lock unit 145.

In an analogous manner, the re-engagement of the parking lock, or reactivation of the parking lock unit 145 can also take place in the first operating state of the ring gear securing unit 210 when the drive unit 230 is reactivated, i.e. when the ring gear 240 of the parking lock gear mechanism 150 is fixed in place, such that the sun gear 220 is rotated by the worm gear 225 in the clockwise direction, as shown previously in FIG. 2. In this manner, the planet carrier 237 is then rotated by the planet gear 235 in the clockwise direction while the ring gear 240 is fixed in place, thus moving the tappet 267 toward the right again, and pushing the cone element 272 back into the securing position 280 in conjunction with the retention wall 275 of the parking lock switch 277.

In the first operating state of the ring gear securing unit 210, i.e. when the position of the ring gear 240 is fixed, the parking lock can be engaged and disengaged any number of times. This merely requires an appropriate activation by the drive unit 230, in order to rotate the sun gear 220 in the clockwise or counterclockwise direction, thus causing the planet carrier 237 to rotate.

Figure 4:
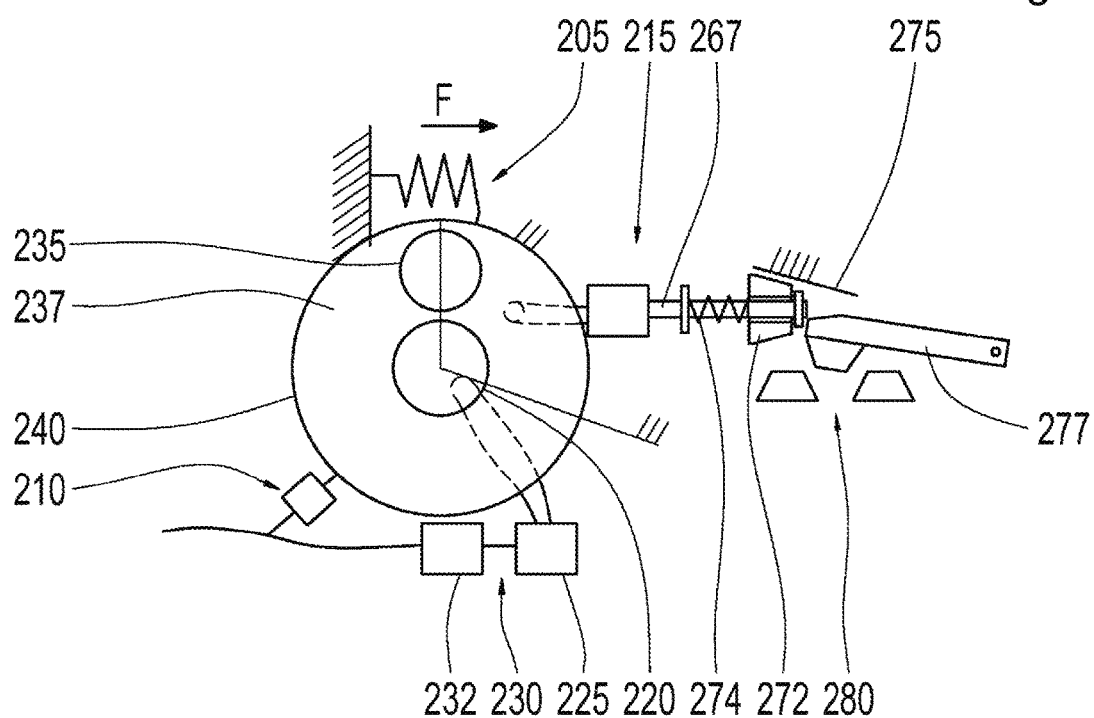
FIG. 4 shows another schematic illustration of a parking lock gear mechanism in accordance with an exemplary embodiment of the approach presented herein, in the first operating state of the ring gear securing unit.

FIG. 4 shows another schematic illustration of the parking lock gear mechanism 150 in accordance with an exemplary embodiment of the approach presented herein, when the ring gear securing unit 210 is in the first operating state. If the parking lock is "open," i.e. the parking lock is disengaged, or the parking lock unit 145 is deactivated, and the electric motor 232 in the drive unit 230 is not supplied with electricity, the sun gear 220 is secured in place, for practical purposes, by the restraint exerted by the worm gear 225. In this case, the tappet 267 of the locking unit 215 is retained as far left as possible, in order to release the parking lock switch 277 form the securing position 280, or keep it released.

Figure 5:
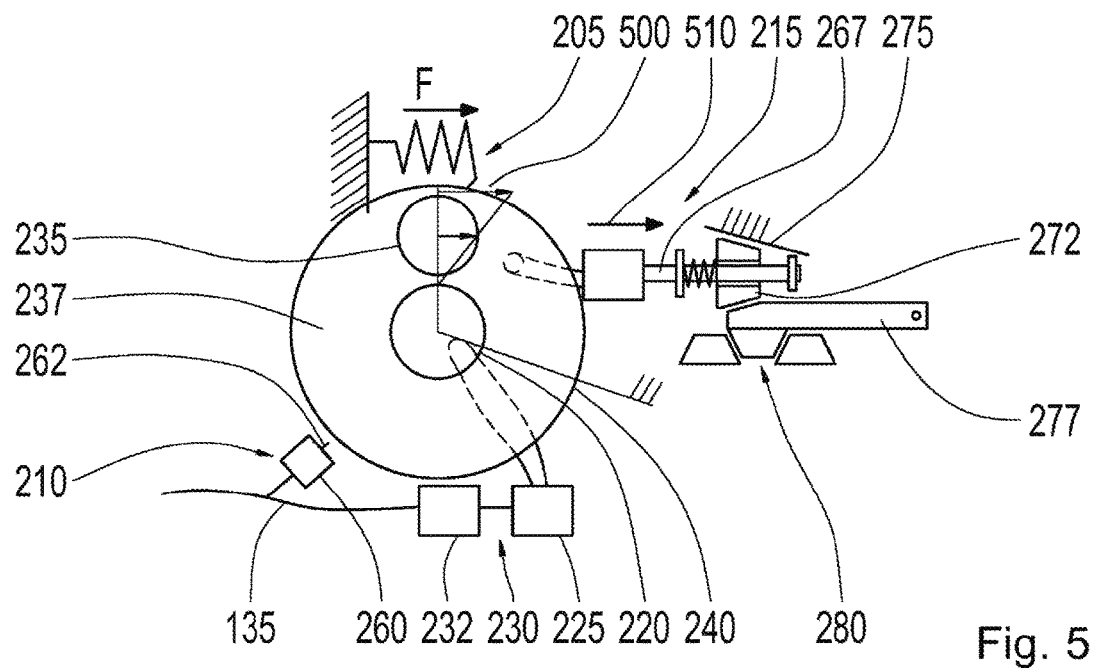
FIG. 5 shows a schematic illustration of the parking lock gear mechanism in accordance with an exemplary embodiment of the approach presented herein.

FIG. 5 shows another schematic illustration of the parking lock gear mechanism 150 in accordance with an exemplary embodiment of the approach presented herein. The parking lock gear mechanism 150 is shown in FIG. 5 in a state in which the supply voltage of the electrical system 135 has malfunctioned. In this case, the electromagnet 260 of the ring gear securing unit 210 is no longer supplied with electricity, such that the pin 262 is retracted, e.g. by the spring force of a spring, not shown in FIG. 5, thus allowing the ring gear 240 to rotate. The ring gear securing unit 210 is thus brought into the second operating state. Rotation of the sun gear 220 is basically blocked by the restraint of the worm gear 225, in particular when the electric motor 232 is no longer supplied with electricity, and represents an additional inertia moment. In this case, a force F, or torque, is exerted on the released ring gear 240 by the tensioned spring unit 205. As a result, an inner tooth, for example, of the released ring gear 240 is moved at the speed 500 depicted in FIG. 5. This then causes a movement of the planet carrier 237, while the sun gear 220 is basically fixed in place, resulting in the tappet 267 of the locking unit 215 being pushed toward the right in the known manner, as indicated by the arrow 510, resulting in turn in the parking lock switch 277 being pushed back into the securing position 280 by the cone element 272 and the retention wall 275. An emergency safety function is thus obtained, which ensures that even when the electrical system malfunctions, the parking lock unit 145 is reliably and securely activated such that the parking lock is engaged.

In other words, in the exemplary embodiments of the approach proposed herein, the functions, "initiation of the fallback solution," and "disengagement of the parking lock" are connected in series. In the approach presented herein, a planetary gear train 200 (revolving gearing) and a worm gear, among others, are used to reduce the motor rotational rate. The serial connection of the functions is formed through a clever exploitation of the three gears of the planetary gear train 200, for example. The following sequences are possible thereby:

Tensioning of the fallback mechanism, as described in greater detail in reference to FIG. 2
Securing the fallback mechanism by fixing the ring gear in place by bringing the ring gear securing unit into the first operating state
Disengagement of the parking lock
Engagement of the parking lock
Releasing the parking lock
Fallback locking The tensioning of the fallback mechanism in particular is particularly advantageous, because it is thus possible to ensure that the parking lock is activated in an emergency, such as a malfunctioning of the electrical system. Thus, when in the state, "parking lock engaged," the motor 232 is rotated in the direction that it is to be rotated when the parking lock is to be further engaged. As a result, the planet carrier 237 is fixed in place, and the rotation of the motor 232 in the drive unit 230 is transferred to the ring gear 240. The "fallback spring" 245 in the spring unit 205 is located on the ring gear 240. This is then tensioned. When the spring 245 has been tensioned, the ring gear 240 is locked in place by an electromagnet 260 in the ring gear securing unit 210.

At this point, the parking lock can be disengaged and engaged any number of times. The parking lock can be engaged and disengaged thereby via the electric motor 232 in the drive unit 230, as shown in greater detail in FIGS. 2 to 4.

If the supply voltage in the electrical system 135 malfunctions, the electromagnet 260 in the ring gear securing unit 210 is no longer supplied with electricity, and the ring unit 240 is released such that it can rotate. When the worm gear of the worm gear 225 is disengaged, serving as a gear stage that has a self-locking effect, the sun gear 220 is locked in place, and power output is obtained via the planet carrier 237.

Figure 6:
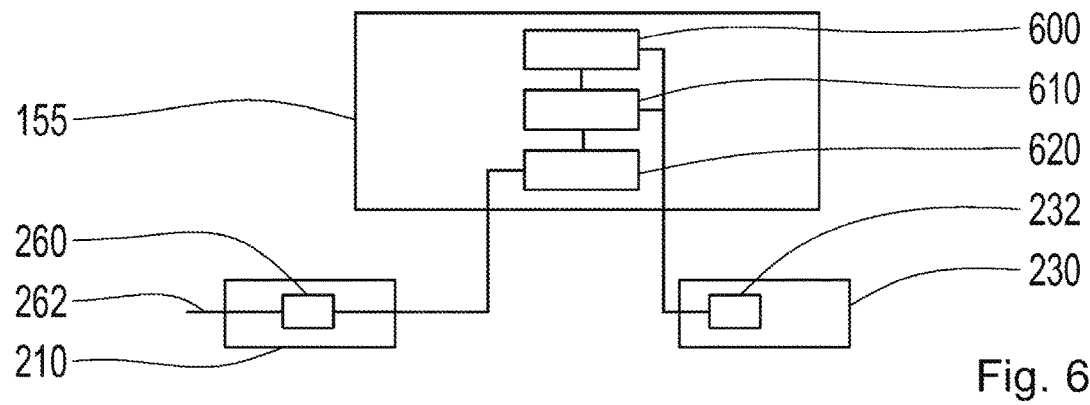
FIG. 6 shows a block diagram of the parking lock gear mechanism control unit in accordance with an exemplary embodiment of the approach presented herein, interacting with the ring gear and the drive unit.

FIG. 6 shows a block diagram of the parking lock gear mechanism control unit 155 in accordance with an exemplary embodiment of the approach presented herein, interacting with the ring gear securing unit 210 and the drive unit 230, in particular the electric motor 232. The parking lock gear mechanism control unit 155 comprises a unit 600 for blocking the rotation of the planet carrier, a unit 610 for tensioning the spring unit, and a switch unit 620 for switching the ring gear securing unit 210 to the first operating state. The blocking unit 600 can be configured thereby to activate the electric motor 232 in the drive unit 230 such that the sun gear 220 is rotated in the clockwise direction, as shown in the illustration in FIG. 2, thus triggering a rotation of the planet carrier 237 by the planet gear 235 into a position in which the tappet 267 bears on the stop element 285. In this case, a further movement of the tappet 267 is blocked, thus blocking further rotation of the planet carrier 237. The bearing of the tappet 267 on the stop element 285 can take place thereby through restricting the current consumption by the electric motor 232, wherein this current consumption by the electric motor 232 is increased when the planet carrier 237 is fixed in place because electricity is needed to tension the spring 245 or the spring unit 205. The unit 610 for tensioning the spring unit 205 can likewise be configured thereby to supply the electric motor 232 with increased electrical power, or electricity, in order to rotate the ring gear 240 in the counterclockwise direction, as shown in FIG. 2, when the sun gear 220 is rotated in the same direction it rotates in order to bring the planet carrier 237 into the fixed state, in order to tension the spring unit 205. The switch unit 620 for can be configured to supply the electromagnet 260 of the ring gear securing unit 210 with electricity after the spring unit 205 has reached the tensioned state, in order to bring the ring gear securing unit 210 into the first operating state, i.e. to extend the pin 262, and thus secure the ring gear 240 against rotation. The spring unit 205 can reach the tensioned state thereby by monitoring the current consumption of the electric motor 232 in the drive unit 230, wherein the tensioned state of the spring unit 205 can then be regarded as having been reached, for example, when the current consumption of the electric motor 232 has exceeded a threshold value.

Figure 7:
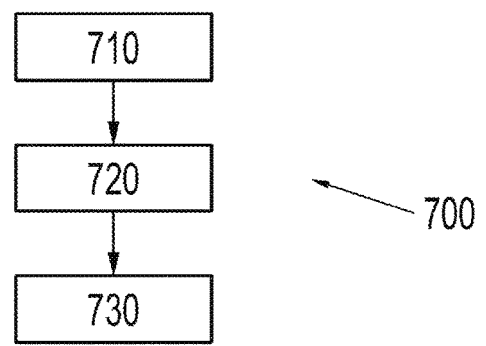
FIG. 7 shows a flow chart of an exemplary embodiment of the approach presented herein in the form of a method.

FIG. 7 shows a flow chart of an exemplary embodiment of the approach presented herein, in the form of a method 700 for operating a variation of a parking lock gear mechanism 150 presented herein. The method 700 has a step 710 for blocking a rotation of the planet carrier, a step 720 for tensioning the spring unit, and a step 730 for switching the ring gear securing unit to the first operating state.

Figure 8A:
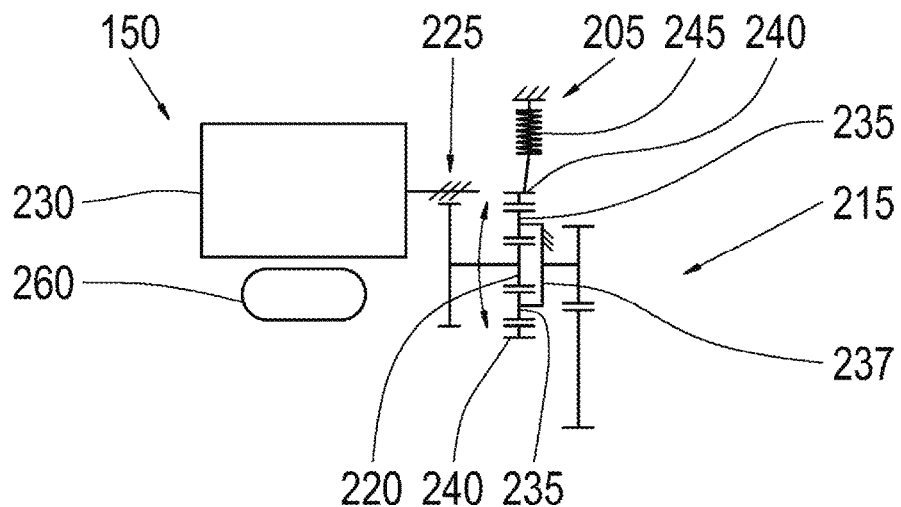
FIGS. 8A to 8C show schematic illustrations of circuit diagrams of a parking lock gear mechanism in different operating modes, in accordance with an exemplary embodiment of the approach presented herein.
Figure 8B:
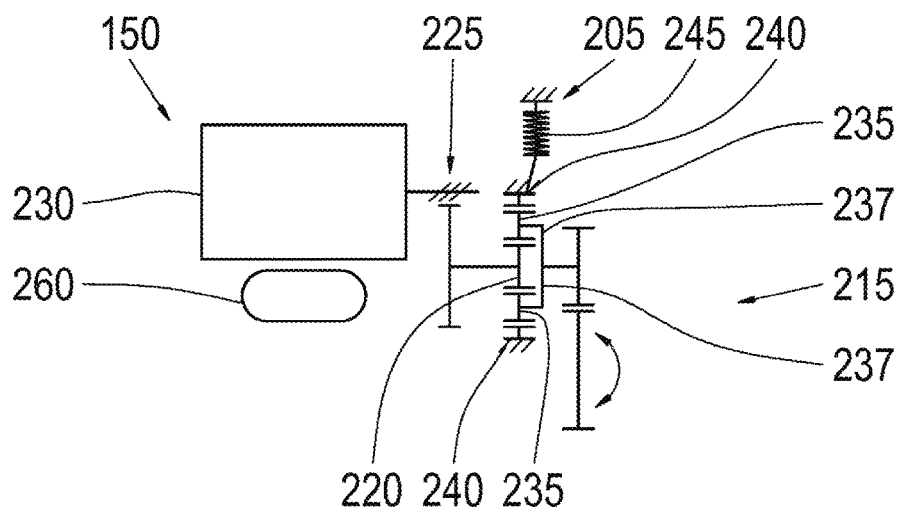
Figure 8C:
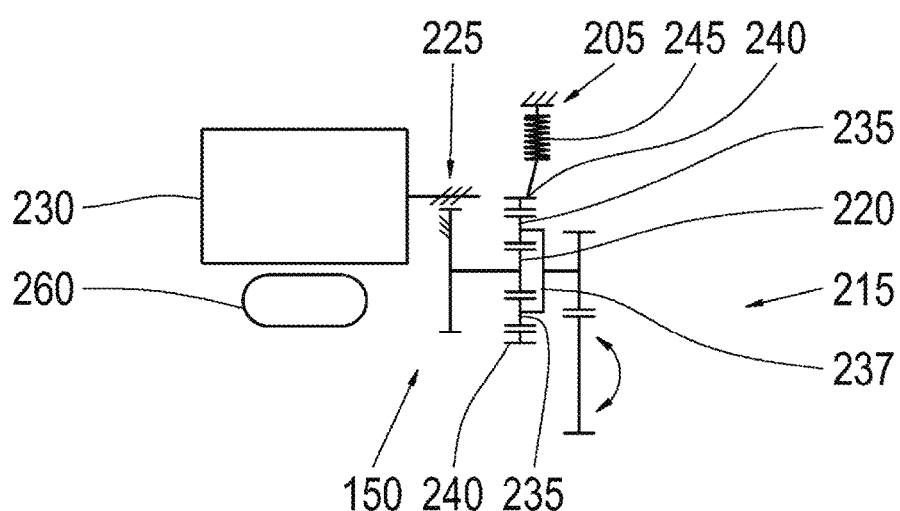

FIGS. 8A to 8C show schematic illustrations of circuit diagrams for a parking lock gear mechanism 150 in different operating modes, in accordance with an exemplary embodiment of the approach presented herein. Some components or elements have been omitted in FIGS. 8A to 8C, for purposes of clarity, which are of no central importance in this context. A state is depicted in the circuit diagram shown in FIG. 8A, in which the spring 245 of the spring unit is tensioned. When the planet carrier 237 is locked in place, the electric motor 232 in the drive unit 230 is supplied with electricity, thus causing the worm gear 225 to rotate the sun gear 220. The spring 245 is then tensioned by the ring gear 240. The ring gear 240 is then secured against rotation by activating the electromagnet 260 of the ring gear securing unit 210, i.e. supplying it with current, as is indicated in the schematic circuit diagram shown in FIG. 8B. In this case, when the ring gear securing unit 210 is in the first operating state, the parking lock can be engaged or disengaged by the electric motor 232, depending on which direction the sun gear 220 is rotated. This engagement or disengagement can take place through a rotation of an element of the locking unit 215. If the supply voltage in the electrical system then decreases or malfunctions, an emergency locking of the parking lock can be obtained through the use of the parking lock gear mechanism presented herein. This can take place, for example, in accordance with the circuit diagram shown in FIG. 8C, through shutting off the current to the electromagnet 260 in the ring gear securing unit 210, such that the ring gear 240 is again released, and can be brought into a state in which the parking lock unit of the vehicle is activated, i.e. the parking lock is engaged, by the effect of the force exerted by the spring 245 in the locking unit 215.

The embodiment examples described above and shown in the figures have only been selected by way of example. Different exemplary embodiments can be combined with one another, either entirely or with respect to individual features. Moreover, an exemplary embodiment may also be supplemented with the features of another exemplary embodiment.

Furthermore, the method steps presented herein can be repeated, or supplemented with further steps.

If an exemplary embodiment comprises an "and/or" conjunction between a first feature and a second feature, this can be read to mean that the exemplary embodiment in accordance with one embodiment includes both the first feature and the second feature, and in accordance with another embodiment, includes either only the first feature or only the second feature.

REFERENCE SYMBOLS 100 vehicle
105 drive motor
110 drive train
115 transmission
120 shaft
125 wheel
130 control unit
132 shift lever
135 electrical system
140 energy store
145 parking lock unit
150 parking lock gear mechanism
155 parking lock gear mechanism control unit
200 planetary gear train
205 spring unit
210 ring gear securing unit
215 locking unit
220 sun gear
225 worm gear
230 drive unit
232 electric motor
235 planet gear
237 planet carrier
240 ring gear
245 spring
250 anchor point
255 fixed point
F force
260 electromagnet
262 pin
265 rod gearing
267 tappet
270 stop element
272 cone element
274 spring
275 retention wall
277 parking lock switch
280 securing position
282 retaining lugs
285 stop element
300 circumferential speed of the sun gear
310 speed of the planet gear
500 speed of the inner teeth of the ring gear
510 retraction direction of the tappet
600 blocking unit
610 tensioning unit
620 switch unit
700 method for operating a parking lock gear mechanism
710 locking step
720 tensioning step
730 switching step

The invention claimed is:

1. A parking lock gear mechanism for operating a parking lock unit of a vehicle, the parking lock gear mechanism comprising:
a planetary gear train having a sun gear, a ring gear, and at least one planet gear that meshes with the sun gear and the ring gear, wherein the at least one planet gear is attached to a rotating planet carrier;
a spring unit coupled to the ring gear, wherein the spring unit is configured such that it is extended or compressed, and therefore tensioned, by a rotation of the ring gear, and exerts a torque and/or force on the ring gear when it is tensioned;
a ring gear securing unit configured to secure the ring gear against rotation in a first operating state, and to release the ring gear such that it can rotate in a second operating state; and
a locking unit coupled to the planet carrier, wherein the locking unit is configured for switching the parking lock unit between a locked state and a released state when the planet carrier rotates.

2. The parking lock gear mechanism according to claim 1, wherein the ring gear securing unit has an electric actuator, wherein the electric actuator brings the ring gear securing unit into the second operating state when the electric actuator is not supplied with current and/or voltage.

3. The parking lock gear mechanism according to claim 2, wherein the electric actuator is an electromagnet.

4. The parking lock gear mechanism according to claim 2, wherein the electric actuator has a projection that engages a tooth of the ring gear.

5. The parking lock gear mechanism according to claim 1, wherein the locking unit is configured to convert a rotation of the planet carrier into a linear movement of a tappet.

6. The parking lock gear mechanism according to claim 5, wherein the locking unit has a stop element, wherein the stop element is configured to delimit a movement path of the tappet, and wherein the stop unit is configured to secure the planet carrier against rotation when the tappet bears on the stop element.

7. The parking lock gear mechanism according to claim 5, wherein the tappet is configured to push a parking lock switch into a securing position on at least one retaining lug when the parking lock unit is moved into the locked state, and wherein the tappet is configured to allow the parking lock switch to move out of the securing position when it is moved into the released state.

8. The parking lock gear mechanism according to claim 5, wherein the tappet has a cone element, and wherein the cone element is configured to bear against a retention wall in order to push the parking lock switch into the securing position.

9. The parking lock gear mechanism according to claim 1, wherein the locking unit has at least one of a rod gearing and a worm gear.

10. The parking lock gear mechanism according to claim 1, further comprising a drive unit coupled to the sun gear, is connected to the sun gear and configured to drive rotation of the sun gear.

11. The parking lock gear mechanism according to claim 10, wherein the drive unit has a worm gear for transferring a rotational movement to the sun gear.

12. The parking lock gear mechanism according to claim 10, wherein the drive unit includes an electric motor for actuating a worm gear, the worm gear being operably connected to the sun gear.

13. The parking lock gear mechanism according to claim 10, wherein the drive unit blocks rotation of the sun gear when it is not supplied with a control signal.

14. The parking lock gear mechanism according to claim 1, wherein the spring unit has at least one of a helical spring and a metallic spring.

15. A method for operating a parking lock gear mechanism, the method comprising:
 blocking a rotation of a planet carrier, wherein the planet carrier is coupled to a planet gear of a planetary gear train, and wherein the planet gear meshes with a sun gear and a ring gear of the planetary gear train;
 tensioning a spring unit coupled to the ring gear by rotating the ring gear; and
 switching a ring gear securing unit to a first operating state to secure the ring gear from rotation.

16. The method of claim 15, further comprising switching the ring gear securing unit to a second operating state to allow the ring gear to rotate.

17. The method of claim 16, wherein the ring gear is coupled to a spring configured to rotate the ring gear when the spring is tensioned.

18. The method of claim 16, wherein the ring gear securing unit has an electric actuator, and wherein the electric actuator brings the ring gear securing unit into the second operating state when the electric actuator is not supplied with a control signal.

19. A control unit coupled to a parking lock gear mechanism of a vehicle, the control unit comprising a computer program, the computer including instructions for activating the following steps:
 blocking a rotation of a planet carrier, wherein the planet carrier is coupled to a planet gear of a planetary gear train, and wherein the planet gear meshes with a sun gear and a ring gear of the planetary gear train;
 tensioning a spring unit coupled to the ring gear by rotating the ring gear; and
 switching a ring gear securing unit to a first operating state to secure the ring gear from rotation.

20. The control unit of claim 19, further comprising a machine-readable storage medium for storing the computer program.

* * * * *